United States Patent Office 2,874,794
Patented Feb. 24, 1959

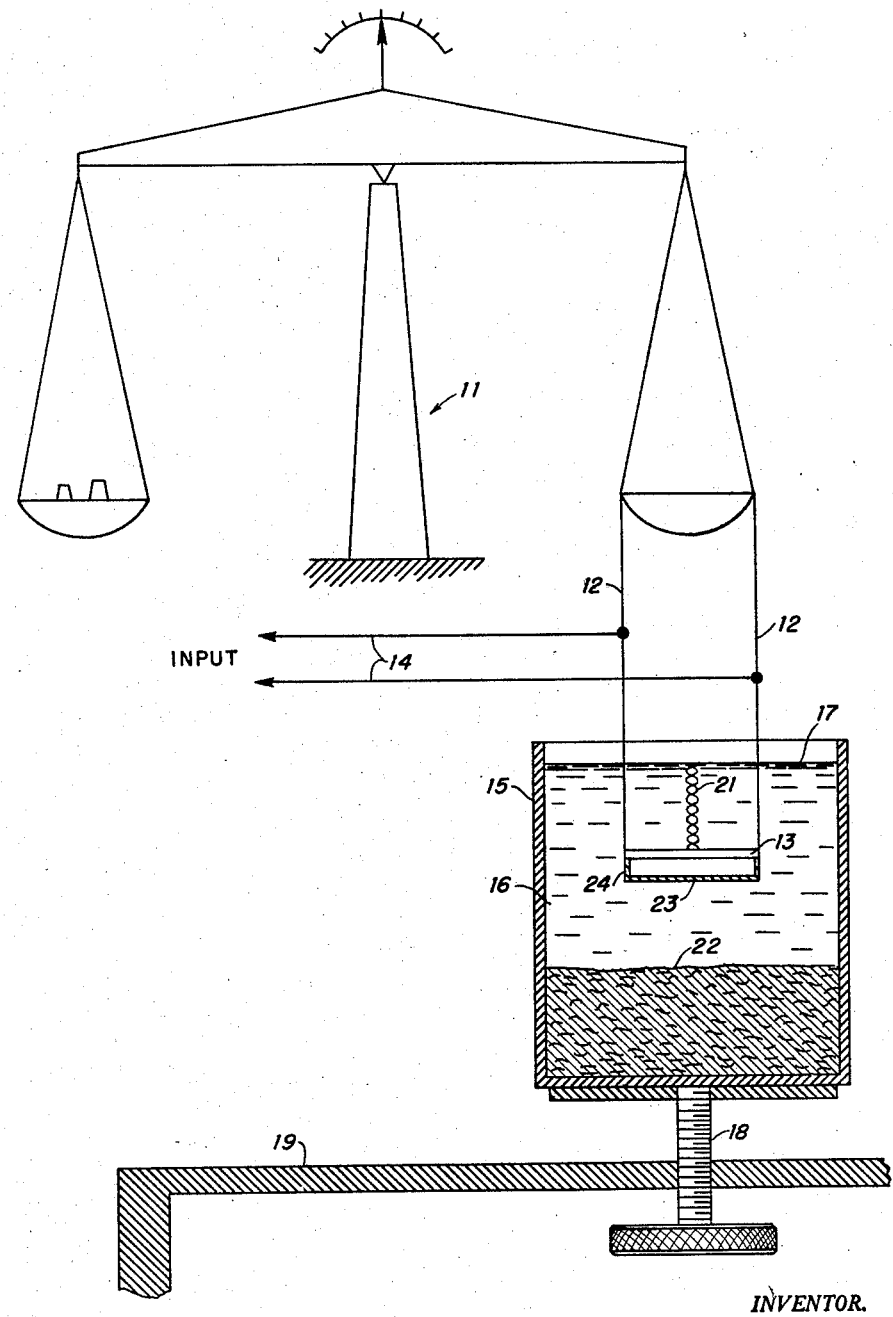

2,874,794

METHOD AND APPARATUS FOR MEASUREMENT OF TOTAL SOUND POWER OUTPUT OF AN ULTRASONIC TRANSDUCER

Earl F. Kiernan, San Diego, Calif.

Application June 18, 1954, Serial No. 437,895

6 Claims. (Cl. 181—.5)

(Granted under Title 35, U. S. Code (1952), sec. 266)

The invention described herein may be manufactured and used by or for the Government of the United States of America for governmental purposes without the payment of any royalties thereon or therefor.

The present invention relates to a method for measuring the total sound power output of transducers and more particularly to a method and apparatus for measuring the sound power output in terms of force (i. e., grams per square centimeter) of the total sound energy radiated into a liquid by an ultrasonic transducer.

Former methods involve indirect methods, such as the temperature rise in a body of liquid, or a sampling technique such as point measurements of intensity level by means of probe hydrophones. These methods are limited by losses of energy by conduction and radiation in the case of temperature measurements, and, in the case of point measurements, by the necessity of applying integration techniques and/or computations.

The present invention relates to a method of providing a direct absolute measurement of total sound output in terms of radiation pressure. The method is based on the actual measurement of the reaction on the transducer itself from the radiated energy. This is done by placing the transducer in a fluid and attaching it to one end of a beam scale. By comparing the condition of balance when voltage is applied and when voltage is not applied, the sound power output can be determined.

An object of the present invention is the provision of an improved method and apparatus for measuring the sound power output of an ultrasonic transducer.

Another object is to provide a method for the direct measurement of the sound power output of an ultrasonic transducer by the actual measurement of the reaction on the transducer itself from the energy radiated therefrom.

Another object is to provide a balance method and apparatus for the direct measurement of the sound power output of an ultrasonic tranducer by comparing the condition of balance of a balance system including a transducer submerged in a fluid before and after a voltage has been applied to the transducer.

Other objects and many of the attendant advantages of this invention will be readily appreciated as the same becomes better understood by reference to the following detailed description when considered in connection with the accompanying drawing where there is shown a view of the apparatus used in practicing the method of this invention.

Referring now to the drawing there is shown a sensitive beam balance 11 such as used in chemical analysis. Suspended from one arm of the balance by fine filament leads 12 is the piezoelectric tranducer 13 undergoing test. Electrical energy is supplied to the transducer through electrical connections 14 from an electrical input source (not shown). The transducer 13 is suspended in a container 15 filled with a liquid 16 such as water or oil.

When voltage is applied, energy is radiated from both the upper and lower faces of the transducer. Since reflection from a liquid to air boundary is 100 percent (page 46 of Ultrasonics by Bergmann, published by John Wiley and Sons, Inc.), the sound energy radiated from the upper face will be almost completely reflected from the liquid-air interface 17. If voltage applied to the transducer is too high, the plane surface of the fluid is interrupted and measurements are no longer accurate. The reaction on the transducer 13 is enhanced by adjusting the distance between the transducer's upper face and the liquid surface 17 by means of screw adjustment 18 on the supporting platform 19 for the container so as to establish a standing wave pattern 21. The depth of the transducer below the surface of the fluid is not critical as long as a standing wave form of maximum amplitude is established. 6" to 8" is considered to be a practical depth.

In order to prevent the establishment of a second pattern of standing waves between the bottom of container 15 and the bottom face of the transducer 13, either or both of two arrangements may be used. In one arrangement a quantity of sound absorbing material 22, such as glass wool, is placed in the bottom of the container to absorb the sound energy and thus prevent the creation of a standing wave pattern. The other arrangement, which may be used instead of, or together with, the first arrangement, is to place a watertight cover 23 over the under face of the transducer to provide an air space 24. Because of the impedance mis-match between the air and the transducer, the sound energy is prevented from leaving the lower face of the transducer.

In operation, the position or condition of balance of the scale 11 is noted before and after the voltage is applied to the transducer. The difference between the two conditions of the balance, without using cover 23, is a measure of pressure due to the effect of the standing wave train 21, the energy radiated from the transducer being in diametrically opposed directions. However, because of 100 percent reflection from the liquid-air boundary 17, and since the reflected waves in the standing wave train are equal in amplitude with the original transmitted waves from the transducer, the effect of the standing wave train is equal to the radiation pressure exerted by one side of the transducer. (This "pressure doubling") is further discussed on page 141 of Acoustics by Beranek published by McGraw-Hill Book Co.) Thus, while it is the effect of the wave train that is being measured, it is also the sound power output in terms of radiation pressure that is also being measured. When cover 23 is used, there is no upward force caused by the radiated wave from the bottom side. The downward force on the transducer is doubled due to the effect of the standing wave train, and with no upward force from the downward radiated wave, the reading will be double that when the cover 23 is not used.

Obviously many modifications and variations of the present invention are possible in the light of the above teachings. For example, the combination of any suitable means for supporting the transducer in predetermined position in the fluid medium and any suitable means for measuring the change in position of the transducer therein due to the reaction of the transducer to the energy radiated therefrom before and after voltage is applied thereto, is within the purview of the present invention. It is therefore to be understood that within the scope of the appended claims the invention may be practiced otherwise than as specifically described.

What is claimed is:

1. The method of measuring the sound power output of an ultrasonic transducer comprising the steps of weighing a transducer suspended in a container of fluid, applying a voltage to said transducer, adjusting the depth of the transducer in the fluid to establish a standing wave pattern and again weighing the transducer activated by the voltage applied.

2. The method of measuring the sound power output of an ultrasonic transducer comprising the steps of weighing a transducer suspended in a container of fluid, inserting a sound wave energy absorbing material in the bottom of said container to prevent formation of standing waves therefrom, adjusting the depth of the transducer in the fluid to establish a standing wave pattern against the fluid surface, applying a voltage to said transducer and again weighing the transducer activated by the voltage applied.

3. The method of measuring the sound power output of an ultrasonic transducer comprising the steps of weighing a transducer suspended in a container of fluid, applying a voltage to said transducer of such magnitude as to not cause interruption of the plane surface of said fluid, adjusting the depth of the transducer in the fluid to establish a standing wave pattern against the fluid surface, and again weighing the transducer activated by the voltage applied.

4. The method of measuring the sound power output of an ultrasonic non-directional transducer comprising the steps of movably suspending the transducer in a body of liquid and counterbalancing the force of gravity thereon to cause said transducer to assume an initial position of rest within said liquid, energizing said transducer to radiate wave energy from the top and bottom sides thereof, suppressing said radiant waves from said bottom side thereof whereby a first force of said radiations from said top side of the transducer urges the same downward within said liquid, adjusting the depth of the transducer in said liquid to establish a standing waveform of maximum amplitude between the surface of said liquid and said top side of said transducer causing a second resultant force on the transducer equalling said first force thereon thereby effectively doubling said force and causing said transducer to be moved to a second position of rest within said liquid, and measuring the distance between said first and said second positions to provide an indication proportional to the sound power of said radiations from said top of said transducer.

5. The method of measuring the sound power output of an ultrasonic transducer comprising the steps of weighing said transducer suspended in a body of liquid, applying a voltage to said transducer causing energy to be radiated therefrom, adjusting the depth of said transducer in said liquid to establish a standing waveform of maximum amplitude between the surface of said liquid and the side of said transducer facing said surface of the liquid, suppressing radiation of waves from the other side of said transducer, and again weighing said transducer activated by said voltage applied.

6. In a system for measuring the sound power output of a transducer comprising a sound transducer, means having a quantity of fluid therein, balance scale means for supporting said transducer in said fluid including electrical leads to the transducer, means for suppressing sound wave radiation from one side of said transducer, adjustable means for varying the depth of the transducer in the fluid permitting a maximum standing wave pattern, the change in balance condition of said scale means providing a measure of the total sound output of the transducer when the same is activated by voltage applied thereto through said leads.

References Cited in the file of this patent
UNITED STATES PATENTS

| | | |
|---|---|---|
| 2,394,461 | Mason | Feb. 5, 1946 |
| 2,435,595 | Mason | Feb. 10, 1948 |
| 2,531,844 | Fiedler | Nov. 28, 1950 |

FOREIGN PATENTS

| | | |
|---|---|---|
| 892,516 | Germany | Oct. 8, 1953 |

OTHER REFERENCES

Barton: "Textbook on Sound," published by MacMillan and Co., London, 1914, page 602. (Copy in Div. 66, Q C 223. B3.)

Carlin: "Ultrasonics," published by McGraw-Hill Book Co., New York, 1949, pages 24–25. (Copy in Div. 36, Q C 243. C3.)

Richardson: "Ultrasonic Physics," published by Elsevier Publishing Co., Houston, 1952, pages 37–39. (Copy in Library, Q C 244. R5.)